(12) United States Patent
Zimmer

(10) Patent No.: US 6,332,237 B1
(45) Date of Patent: Dec. 25, 2001

(54) WINDSCREEN WIPER JOINT

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,511

(22) PCT Filed: Jul. 14, 1999

(86) PCT No.: PCT/DE99/02171

§ 371 Date: Mar. 29, 2000

§ 102(e) Date: Mar. 29, 2000

(87) PCT Pub. No.: WO00/10844

PCT Pub. Date: Mar. 2, 2000

(30) Foreign Application Priority Data

Aug. 18, 1998 (DE) .............................. 198 37 359

(51) Int. Cl.⁷ ..................................... B60S 1/32
(52) U.S. Cl. ................ 15/250.352; 15/250.31; 403/155

(58) Field of Search ............... 15/250.352, 250.351, 15/250.46, 250.31; 403/154, 155, 270, 271

(56) References Cited

FOREIGN PATENT DOCUMENTS

| | | |
|---|---|---|
| 37 44 237 A1 | 7/1989 | (DE) . |
| 44 39 275 A | 5/1995 | (DE) . |
| 0 368 091 A | 5/1990 | (EP) . |
| 0 575 241 A | 12/1993 | (EP) . |
| 0 845 394 A | 6/1998 | (EP) . |

*Primary Examiner*—Gary K. Graham
(74) *Attorney, Agent, or Firm*—Michael J. Striker

(57) ABSTRACT

A wiper has a wiper arm including a fastening part and a pivot part with a wiper rod, the fastening part and the pivot part having side walls and being formed as partially overlapping components, and a hinge joint provided between the fastening part and the pivot part and including a pivot bolt which extends through an inner component and is welded to insides of the side walls of the outer component.

7 Claims, 2 Drawing Sheets

WINDSCREEN WIPER JOINT

BACKGROUND OF THE INVENTION

The present invention deals with wipers.

Known wipers have a wiper arm, which is comprised of a fastening part and a hinge part connected to it, which has a wiper rod. A hook-shaped end of the wiper rod engages in a hinge box of a wiper blade, which is formed between two side walls of a central bracket, and contains a pivot pin. The hinge joint thus produced guides the wiper blade during the pivoting motion over the window. As a rule, the wiper blade has a multi-part support bracket system with subordinate brackets connected to the central bracket by means of additional pivot pins, and at least some of these subordinate brackets have claws at their ends, which secure a wiper strip on its top strip. The multi-part support bracket system and spring strips inserted into the top strip make it possible for the wiper strip to adapt to a curved windshield with a uniform contact pressure during wiping. Wipers of this kind are known, for example, from DE 37 44 237 A1. In simplified embodiments, subordinate brackets, also referred to as intermediary brackets and claw brackets, can be eliminated. In the simplest case, the central bracket itself has claws with which it holds the wiper strip.

The pivot bolt and the pivot pins are slid through bores in the side walls of partially overlapping components and are riveted at the ends. As a result, protruding rivet heads are produced on the outsides, which interrupt the airflow, disturb the visual appearance, and tend to corrode.

SUMMARY OF THE INVENTION

According to the invention, the pivot bolt and the pivot pins are welded to the insides of the side walls of the outer component. This produces smooth surfaces on the outsides, which have a streamlined and more attractive appearance. Furthermore, hardly any dirt and moisture can collect in these regions so that they are less prone to corrosion.

In order to facilitate manufacturing, in the vicinity of the pivot bolt and the pivot pins, indentations are provided on the insides and, with their convexly embodied ends, the pivot bolt and the pivot pins can engage in detent fashion in these indentations before they are welded to the side walls. A resistance welding process is particularly well-suited for this welding.

DESCRIPTION OF THE DRAWINGS

Other advantages ensue from the following description of the drawings. An exemplary embodiment of the invention is shown in the drawings. The drawings, the specification, and the claims contain numerous features in combination. One skilled in the art will also suitably consider the features individually and will form other meaningful combinations from them.

DESCRIPTION OF THE PREFERRED EMBODIMENTS

Figure 1:
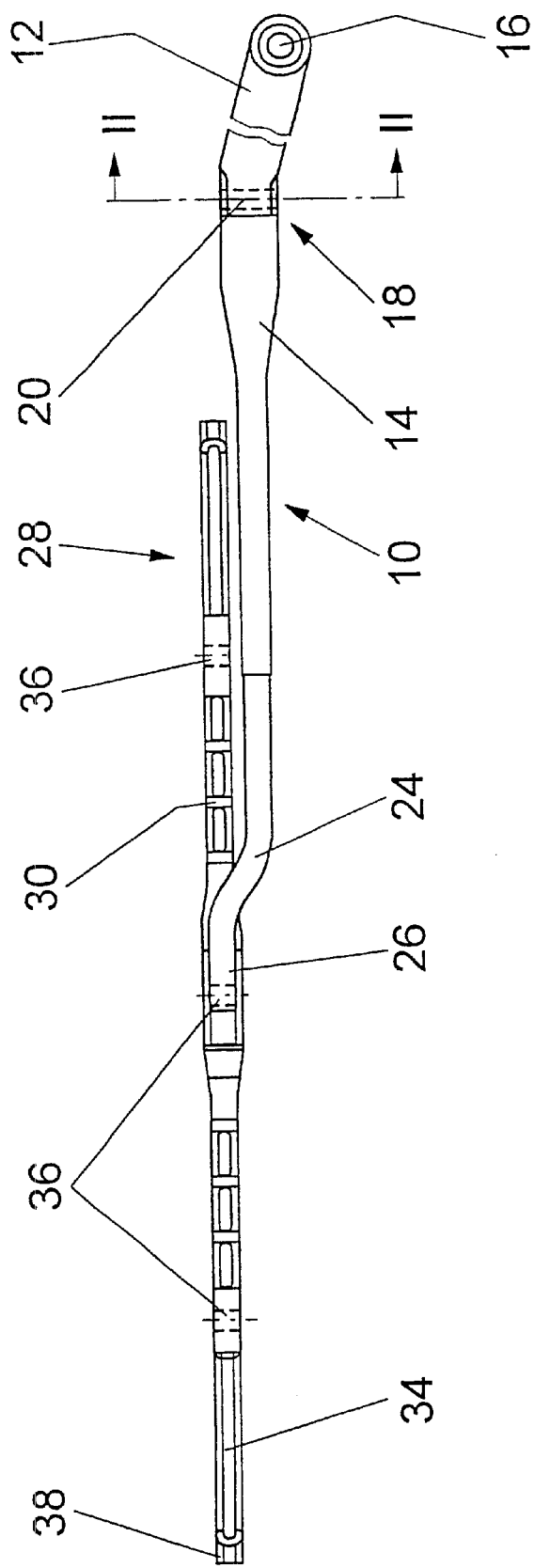
FIG. 1 shows a top view of a wiper.

A wiper arm 10 is comprised of a fastening part 12 and a pivot part 14 with a wiper rod 24. A wiper blade 28 is connected to the wiper arm 10 by virtue of the fact that a hook-shaped end 26 of the wiper rod 24 engages between side walls of a central bracket 30 of the wiper blade 28 and encompasses a pivot pin 36. Subordinate brackets in the form of claw brackets 34 are connected to the ends of the central bracket 30 by means of additional pivot pins 36 and hold a wiper strip 38.

At one end, the fastening part 12 has a support point 16 at which it is fastened to a drive shaft of a wiper drive mechanism that is not shown in detail. At its other end, it forms a hinge joint 18 with the pivot part 14 by virtue of the fact that side walls 44 and 46 (FIG. 2) in the vicinity of the hinge joint 18 coincide with side walls 40 and 42 of the fastening part 12 and are connected by means of a pivot bolt 22 so that they can be pivoted around a pivot axis 20. The pivot bolt 22 has convex ends 54 with which it engages in detent fashion in indentations 32 of the outer side walls 44, 46 of the pivot part 14. After pre-assembly, the pivot bolt 22 is connected to the side walls 44, 46 by means of resistance welding. The outer surfaces of the side walls 44, 46 are therefore smooth and streamlined. Since no aggressive mediums and dirt can collect on them, they are also corrosion resistant.

The fastening part 12 is supported on the pivot bolt 22 by means of support bushings 48, which have a collar 50 between the side wall 40, 42 and the side wall 44, 46 in order to prevent metallic contact between these side walls. The outer surface of the side wall 40, 44 has a shoulder 52, which partially overlaps the collar 50 axially and consequently reduces the gap between the outer side wall 44, 46 and the inner side wall 40, 42.

Figure 3:
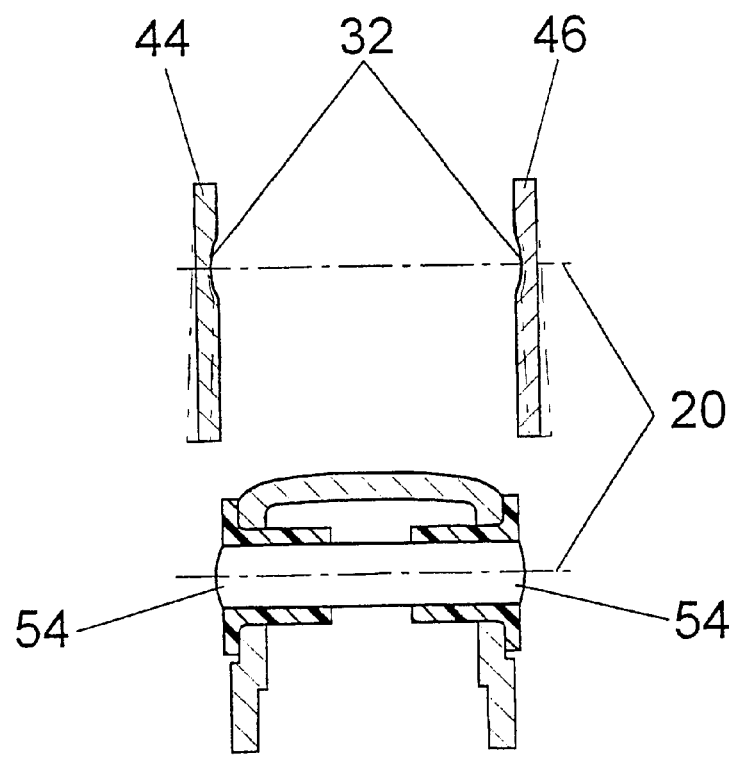
FIG. 3 shows a section through a partially installed wiper arm according to FIG. 2.

FIG. 3 shows the hinge joint 18 halfway installed. The support bushings 48 and the pivot bolt 22 have already been preinstalled in the fastening part 12. In order to insert the fastening part between the side walls 44 and 46, these side walls are bent slightly outward in an elastic fashion, as indicated with dot-and-dash lines, so that the ends 54 of the pivot bolt 22 can engage in detent fashion in the indentations 32.

Figure 2:
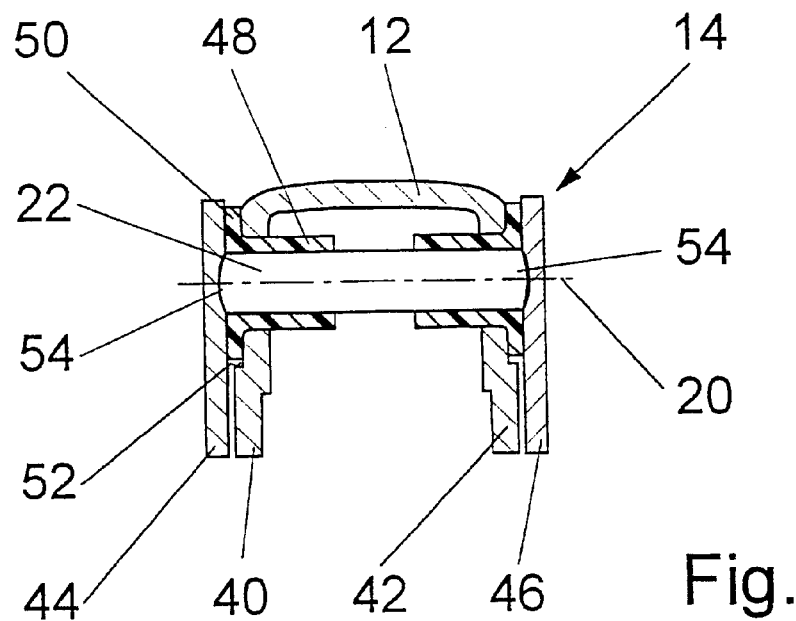
FIG. 2 shows a section according to the line II—II in FIG. 1.

The connection between the pivot bolt 22 and the side walls 44, 46, which is shown in more detail in FIGS. 2 and 3, can correspondingly be used for connecting the pivot pins 36 to the central bracket 30 and the claw brackets 34.

Reference numerals wiper arm
fastening part
pivot part
support point
hinge joint
pivot axis
pivot bolt
wiper rod
hook-shaped end
wiper blade
central bracket
indentation
claw bracket
pivot pin
wiper strip
side wall
side wall
side wall
side wall
support bushing
collar
shoulder
end

What is claimed is:

1. A wiper, comprising a wiper arm including a fastening part and a pivot part with a wiper rod, said fastening part and said pivot part having side walls and being formed as partially overlapping components; a hinge joint provided between said fastening part and said pivot part and including a pivot bolt which extends through an inner component and is welded to insides of said side walls of said outer component.

2. A wiper as defined in claim 1, and further comprising a wiper blade having a bracket provided with side walls and forming another outer component to said first mentioned inner component; and a pivot pin extending through said inner component and welded to insides of said side walls of the other outer component.

3. A wiper as defined in claim 2, wherein said wiper blade has subordinate brackets connected to said first mentioned bracket; and further comprising additional pivot pins connecting said supporting bracket to said first mentioned bracket.

4. A wiper as defined in claim 2, wherein said pivot bolt is welded with use of resistance welding.

5. A wiper as defined in claim 2, wherein said side walls of the other outer component have indentations, said pivot pin having convex ends engaging in detent fashion in said indentations before the welding.

6. A wiper as defined in claim 1, wherein said pivot pin is welded with use of resistance welding.

7. A wiper as defined in claim 1, wherein said side walls of said outer component have indentations, said pivot bolt having convex ends engaging in detent fashion in said indentations before the welding.

* * * * *